United States Patent [19]

Lightle

[11] Patent Number: 5,795,108
[45] Date of Patent: Aug. 18, 1998

[54] METHOD OF MOVING AND PLACING GRANULAR MATERIALS

[76] Inventor: Roger G. Lightle, 309 St. Lucie La., Ft. Pierce, Fla. 34946

[21] Appl. No.: 680,815

[22] Filed: Jul. 16, 1996

[51] Int. Cl.$^6$ ............................................. B65G 53/08
[52] U.S. Cl. .......................... 406/48; 406/39; 406/68; 406/79; 406/123
[58] Field of Search .................. 406/39, 48, 63, 406/68, 79, 123, 164, 165

[56] References Cited

U.S. PATENT DOCUMENTS

| | | | |
|---|---|---|---|
| 2,059,950 | 11/1936 | Johnson | 406/123 X |
| 3,096,968 | 7/1963 | Kempthorne | 406/48 X |
| 3,161,442 | 12/1964 | Reed | 406/63 |
| 3,350,014 | 10/1967 | Pfister | 406/48 X |
| 4,844,340 | 7/1989 | Miyata et al. | 406/48 X |
| 5,147,156 | 9/1992 | Guettler et al. | 406/79 X |

*Primary Examiner*—Andrew C. Pike
*Attorney, Agent, or Firm*—William M. Hobby, III

[57] ABSTRACT

A method of placing granular materials, such as sand, on a golf course or the like includes loading granular materials into a hopper for feeding a sand gun, directing the granular materials from the hopper into the sand gun, and directing compressed air into the sand gun and into an elongated flexible hose to thereby direct the granular materials into the sand gun through the flexible hose. The sand gun also includes the step of spinning the granular materials therein. The granular materials passing through the flexible hose are directed through an exit nozzle and water may be injected from a water source through the exit nozzle and into the granular materials whereby granular materials and water from remote locations are distributed through a flexible hose onto a predetermined site by aiming the nozzle.

7 Claims, 4 Drawing Sheets

METHOD OF MOVING AND PLACING GRANULAR MATERIALS

BACKGROUND OF THE INVENTION

The present invention relates to a method of transporting and placing granular materials, such as sand, through a flexible hose and especially to the placing of sand onto a golf course sand trap.

Granular materials, such as sand and gravel of different sizes, are frequently conveyed through a hose by being entrained in an airstream. Such transmission of granular material is found in concrete construction where a mixture of sand and cement is pumped dry or slightly damp through a hose to a nozzle where it is positioned at a remote location with the nozzle. A common problem in the placement of sand has been in the building or replacement of sand in golf course sand traps. The sand traps are placed in selected positions around golf courses, such as adjacent putting greens, to serve as hazards to the golfers playing the course. Typically, sand is obtained from a sand source located at a distance from the golf course and hauled by truck to the golf course where it is moved to the sand traps in wheel barrels or the like. Periodically, the sand in the traps must be removed and replenished with new sand which is a labor intensive operation.

In one prior patent to Guettler et al., U.S. Pat. No. 5,147,156, a golf course construction and maintenance method places sand or gravel onto a sand trap of a golf course for construction or maintenance purposes by pneumatically transporting the sand through a flexible conduit from a remote site to the selected area and positioned with a nozzle at the selected area by spraying from the nozzle onto the selected sand trap. Other U.S. patents which transmit granular materials through hoses or pipes include the Reed U.S. Pat. No. 3,161,442, for transmission of granular materials which feeds the sand into a hopper where a plurality of agitator blades mounted on a rotary shaft mix the materials, encouraging the materials to pass through the hopper. In the to Hansen, U.S. Pat. No. 1,591,378, a pneumatic conveyor for molded sand feeds the sand into a hopper where a conveyor feeds it to the flexible hose and compressed air drives the sand through the hose where it is positioned in the mold by a person holding an exit nozzle. The Warman U.S. Pat. No. 1,673,276, is a sand-throwing machine for foundries which facilitates the filling of molds with sand. The Vance U.S. Pat. No. 4,249,839, is a method and apparatus for suspending and transporting particulate materials, especially for depositing thermal insulation into building spaces utilizing pressurized air driving the materials through a flexible hose. The Bordelon et al. U.S. Pat. No. 3,384,422, is a grain trimming machine for handling bulk grain for loading grain onto ships or other vehicles and has a hopper for loading the grain and has air hoses connected along couplings at various points along flexible hoses for directing the grain through the hoses to an output nozzle. The Diemert U.S. Pat. No. 4,025,122, is an apparatus for the transportation of granular materials, such as concrete, through a pneumatic discharge using a hopper with rotating blades for breaking up the materials.

The present invention improves on the method of transmission and placing of granular materials, such as sand and stabilizer product, onto golf courses or the like, through a flexible hose which uses a hopper feeding the granular materials to a sand gun having spinning pockets for breaking up the sand and directing the sand into a flexible hose with compressed air directed through the sand gun to direct the sand and granular materials through the hose. The nozzle at the end of the flexible hose includes a water hose connection for directing water into the nozzle for injecting water into a granular material, such as a soil stabilizer, passing through the nozzle.

SUMMARY OF THE INVENTION

A method of placing a granular material, such as sand or a soil stabilizer, on a golf course or the like includes loading the granular material into a hopper of a sand gun, directing the granular material from the hopper into a spinning pocketed wheel, and directing compressed air through the sand gun and into an elongated flexible hose to thereby direct the granular material from the spinning wheel pockets through the flexible hose. The granular material passing through the flexible hose is directed through an exit nozzle where water may be injected from a water source into the granular material passing therethrough for dispensing the granular material and water from the nozzle whereby granular material and water from remote locations are distributed through a flexible hose onto a predetermined site by aiming the nozzle.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
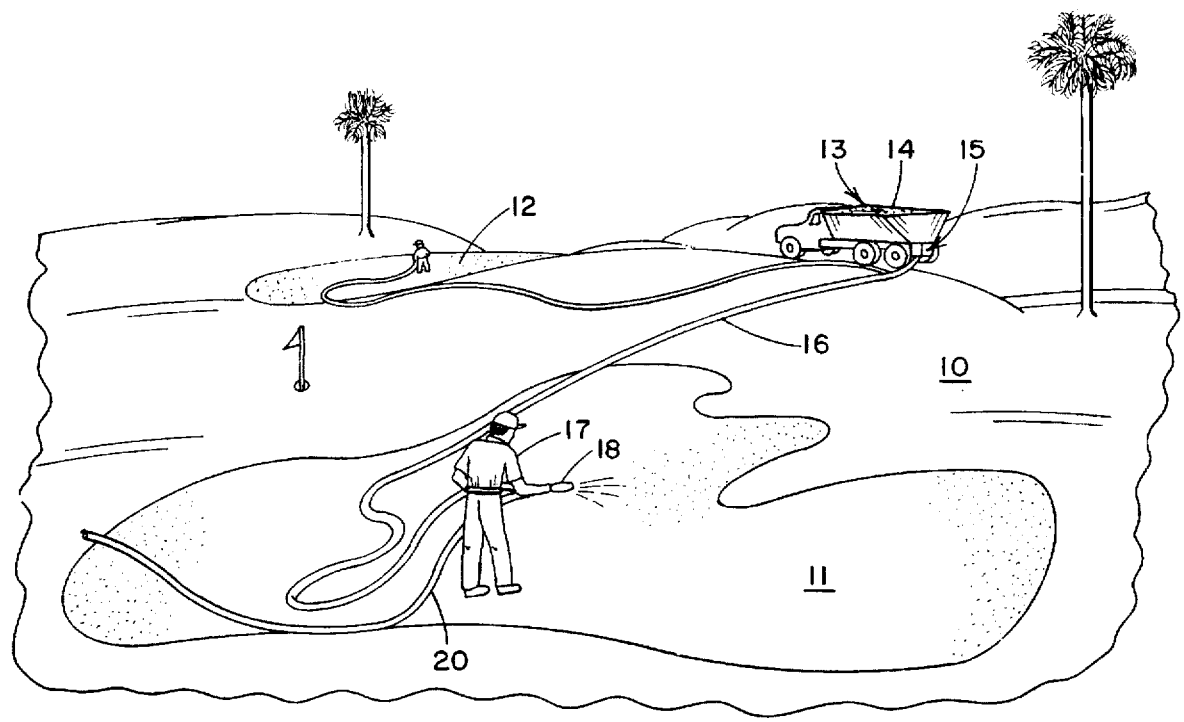
FIG. 1 is a perspective view of the placement of granular material onto a golf course.

Referring to the drawings and especially to FIG. 1, a golf course 10 is illustrated having sand traps 11 and 12 located thereon. A truck 13 is filled with granular material 14 and has sand guns 15 attached thereto. The sand gun is interconnected with an elongated flexible hose 16 which has an individual 17 holding the end thereof and aiming the nozzle 18 onto the sand trap 11. A water hose 20 is connected from a water source to the nozzle 18. The hose 16 is made of a flexible wear- and abrasive-resistant polymer material, such as a reinforced rubber, but which may be a self-lubricating polymer for easy movement of the product through the hose. The embodiment of FIG. 1 shows the distribution of granular material into a golf course sand trap but it should be clear that any granular product can be distributed to any destination desired without departing from the spirit and scope of the invention. A soil stabilizer is an organic soil additive in granular form that forms an adhesive to bind soil or aggregates together to make the soil or aggregate firmer but still allows the drainage of water therethrough.

Figure 2:
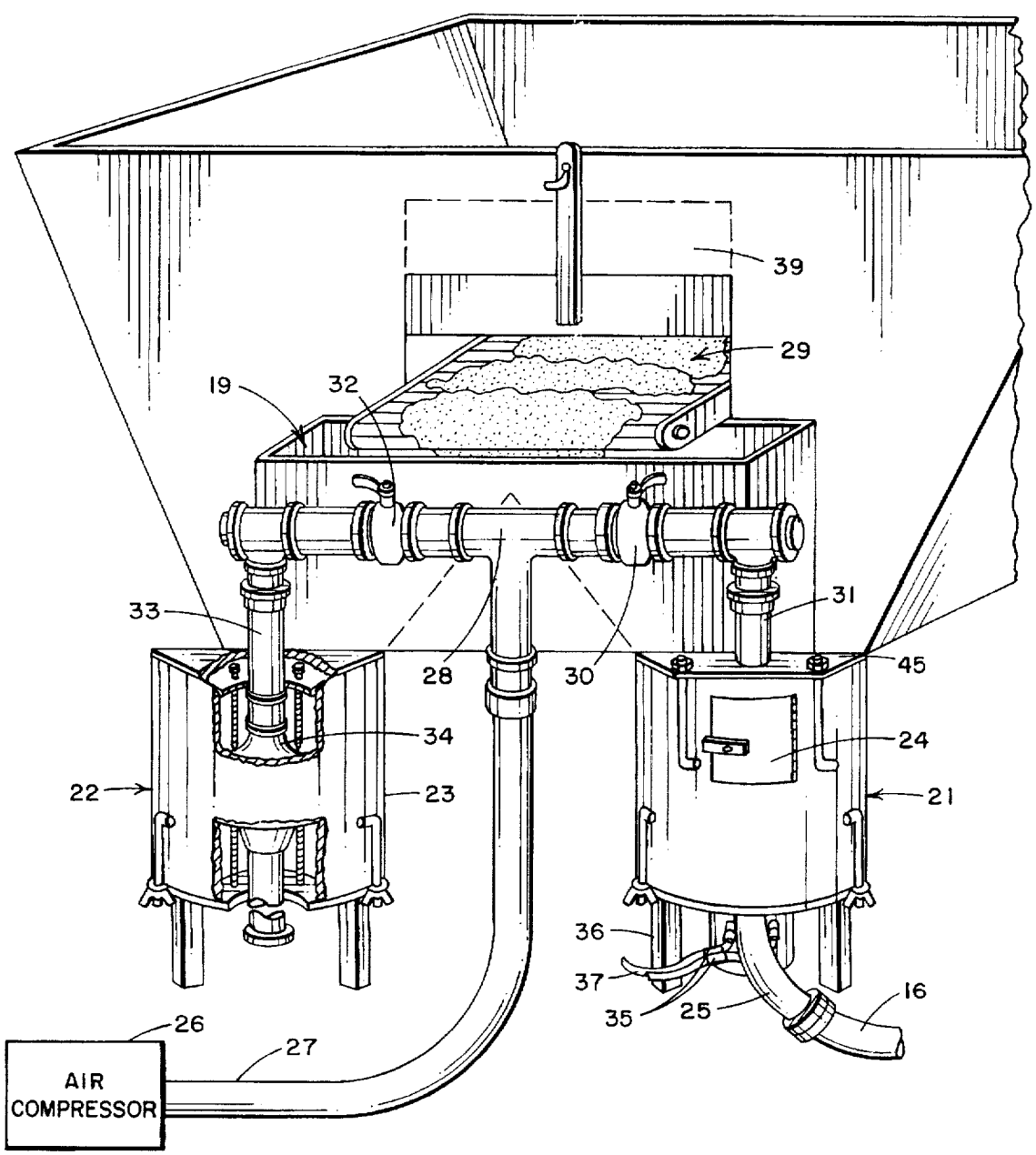
FIG. 2 is a cutaway perspective of a pair of sand guns connected to a sand placement hose in accordance with the present invention.
Figure 3:
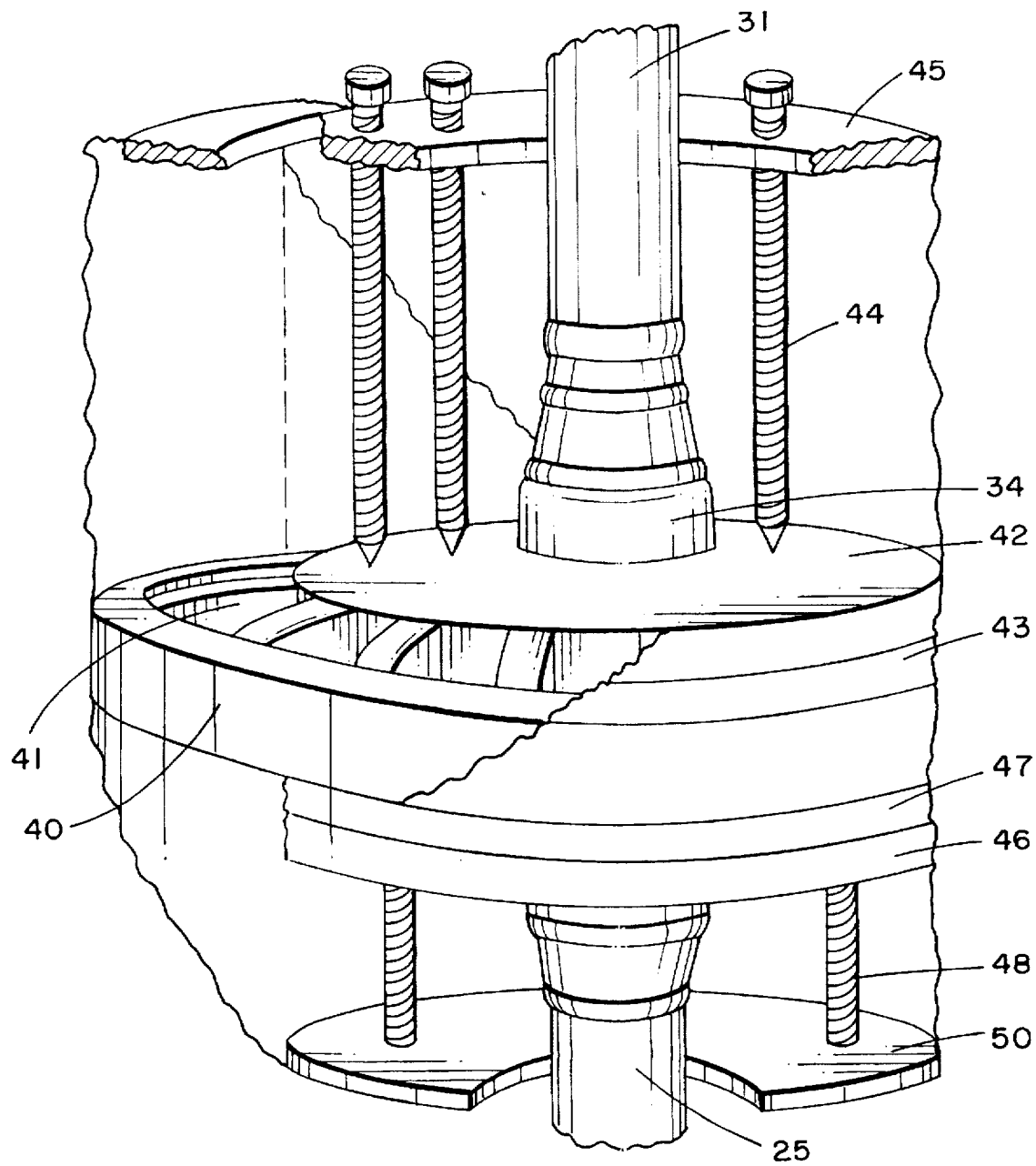
FIG. 3 is a cutaway perspective view of one of the sand guns of FIG. 2.
Figure 4:
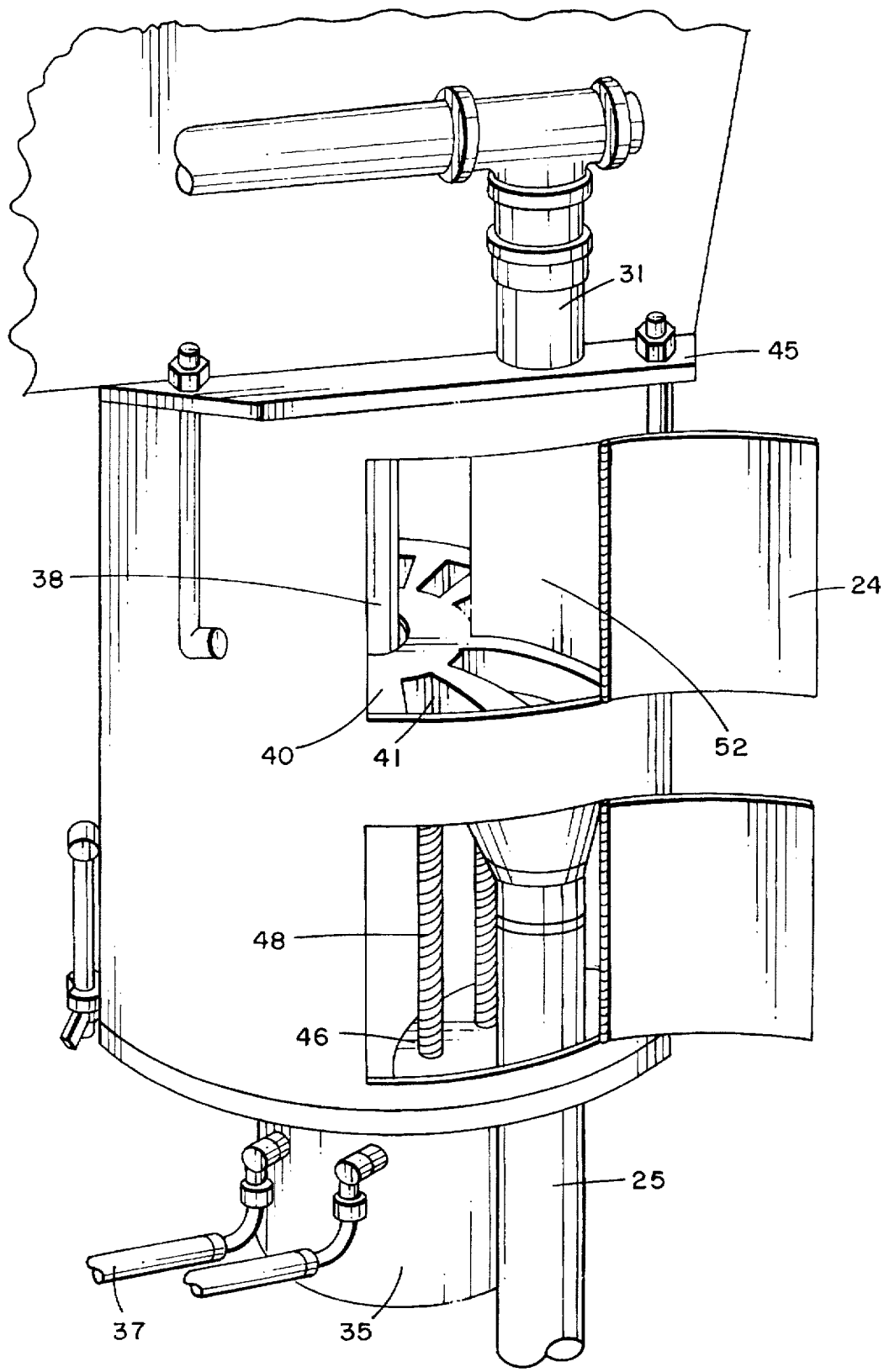
FIG. 4 is a perspective view of one of the sand guns in accordance with FIGS. 2 and 3.

Turning to FIGS. 2–4, a pair of sand guns 21 and 22 are identical and each has a housing 23 having a door 24 which can be opened for access to the funnel chamber and for maintenance of the inner sand gun from a hopper 19 into the housing 23. The hopper 19 is fed by a motor drive conveyor belt 29 that carries the granular material to the hopper 19. An adjustable door 39 can be raised or lowered to control the amount of granular material exiting the hopper. Each sand gun 21, 22 has an exit pipe 25 connected to the elongated hose 16 for feeding the sand from the sand gun to a remote location at the end of the hose 16. A source of compressed air can be an air compressor 26 which feeds an air hose 27 into a T-coupling 28 which directs air through a gate valve 30 into an inlet pipe 31 into the sand gun 21. The air through the T-coupling 28 is also fed through a gate valve 32 and through a second inlet pipe 33 into the sand gun 22. The inlet 33 feeds air into the housing 23 and into a center manifold 34. Each sand gun 21 and 22 has a hydraulic motor 35 mounted on the bottom of the housing 23 and each housing is supported on legs 36. Hydraulic motor 35 is fed by hydraulic pressure lines 37. It should, of course, be clear that an electric or pneumatic motor could be used in place of the hydraulic motor 35. The hydraulic motor 35 rotates the shaft 38 which passes through the housing 23 and is attached to a rotating wheel 40 having a plurality of pockets 41 positioned radially therearound.

The rotating pocketed wheel 40 has a steel plate 42 on the top thereof with a rubber or polymer wear pad 43 mounted thereto which rides against the rotating wheel 40. The wear plate 43 can be adjusted as to the seal and pressure against the plate 40 by a plurality of tension rods 44 which are threadedly attached through the top plate 45 of the housing 23 to drive against the top of the plate 42. Similarly, a steel bottom plate 46 has a rubber or polymer wear pad 47 attached thereto which rides against the bottom of the rotating wheel 40 to maintain the bottom seal so that the pockets 41 continuously ride between the sealing pads 43 and 47. The steel plate 46 is adjusted with threaded tensioning rods 48 which are threaded through the bottom 50 of the housing 21.

The air entering the inlet hose 31 passes through the coupling 34 in the steel plate 42 and the wear pad 43 to direct air into and through the ends of the pockets 41, directing the granular material being spun in the pockets into the exit hose 25 and into the flexible hose 16. The granular material is conveyed by means of a rotating slated belt 29 into the funnel chamber 52 and feeds from the funnel chamber 52 into the pockets 41 of the spinning wheel 40. Spinning wheel 40 has portions of the pockets 41 open at the top for the granular material in the funnel chamber 52 to enter where it is being constantly spun by the rapidly rotating wheel 40 and where it is fed toward the center and blown therefrom with the air passing through the center of the rotating wheel 40 into the exiting pipe 25. The sand guns 21 and 22 can be worked in banks, as shown in FIG. 2, having one compressed air source feeding two sand guns in order to increase the volume of the output and delivery of the granular materials through the pipes 16. The effect of the spinning pocketed wheel feeding a plurality of spinning sand in the pockets toward the pressurized air passing through the center thereof produces a very effective movement of granular materials through a flexible pipe. The air pressure can be increased for greater lengths of the pipe 16.

Figure 5:
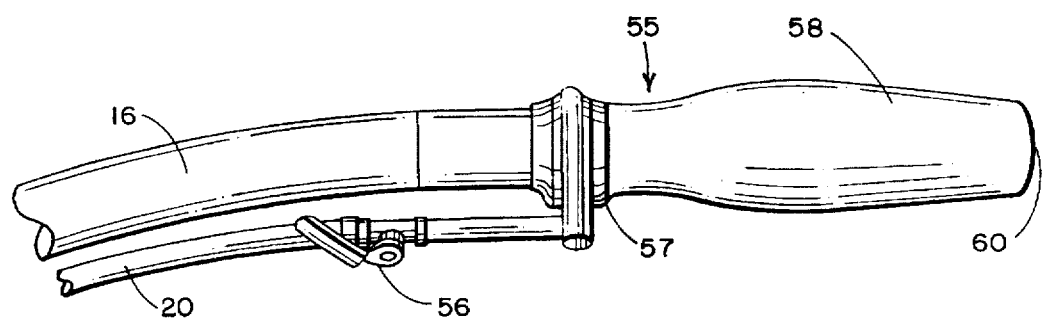
FIG. 5 is a side elevation of a placement nozzle for directing the conveyed sand of the present invention.

Turning to FIG. 5, a nozzle 55 can be seen having the flexible polymer hose 16 attached thereto and also having the water hose 20 attached through a control valve 56 into the nozzle portion 57. The nozzle has a distribution portion 58 and a tip 60. Pneumatically driven granular material, such as stabilizer product, through the hose 16 passes into the nozzle 55 where water can be applied thereto and can be controlled by the valve 56 for distributing the stabilizer product out the end 60 of the nozzle portion 58 with predetermined amounts of water.

In operation, sand 14 from a source, such as a truck 13, is fed into one or more sand guns 21 or 22 through a funnel chamber 52. The hopper feeds the granular material into the rapidly spinning pocketed wheel 40 pockets 41 where it is broken up and spun and fed into the high pressure air stream from the entrance pipes 31 and 33 through the center of the pocketed wheel and out the exhaust pipe 25 where the air pushes the granular material through the flexible abrasion resistant polymer hose 16. The individual 17 can hold the nozzle 55 and distribute the granular material into a sand trap 11 and can connect a water source through a water hose 20 which is controlled by the operator 17 through the valve 56 to control the amount of water being distributed with the granular material.

It should be clear at this point that a granulized material for sand distribution system and apparatus has been provided which can rapidly fill golf course sand traps or other areas with granular material. However, it should also be clear that the present invention is not to be considered as limited to the forms shown which are to be considered illustrative rather than restrictive.

I claim:

1. A method of placing granular material onto a golf course comprising the steps of:

loading said granular material into a hopper;

directing said granular material from said hopper into a pair of sand guns;

spinning said granular material in each said sand gun;

directing said granular material in each said sand gun into a flexible hose connected to each said sand gun;

directing compressed air from a common air source into each said sand gun and into each said flexible hose to thereby direct said granular material in each said sand gun through each said flexible hose;

directing said granular material passing through each said flexible hose through an exit nozzle on each said flexible hose; and injecting water into each said exit nozzle from a separate water supply hose connected to each said exit nozzle and into said granular material being dispensed for dispensing said granular materials and the water from said nozzle whereby said granular materials and the water from a remote location are distributed through said flexible hoses onto a predetermined site.

2. The method of placing the granular material onto the golf course in accordance with claim 1 in which the step of directing the compressed air into each said flexible hose includes directing the compressed air into wear-resistant polymer hoses.

3. The method of placing the granular material onto the golf course in accordance with claim 1 in which the step of directing the compressed air into each said flexible hose includes directing the compressed air into wear-resistant rubber hoses.

4. The method of placing the granular material onto the golf course in accordance with claim 1 in which the step of spinning said granular material in each said sand gun includes feeding sand into a plurality of spinning pockets.

5. The method of placing the granular material onto the golf course in accordance with claim 4 in which the step of feeding said sand into each said sand gun plurality of spinning pockets includes driving said plurality of spinning pockets with a hydraulic motor.

6. The method of placing the granular material onto the golf course in accordance with claim 4 in which the step of feeding said granular material into each said sand gun plurality of spinning pockets includes spinning said spinning pockets between sand gun wear plates.

7. The method of placing the granular material onto the golf course in accordance with claim 1 in which the step of injecting the water includes controlling the injected water with a water valve located adjacent each said nozzle.

* * * * *